Patented Feb. 11, 1947

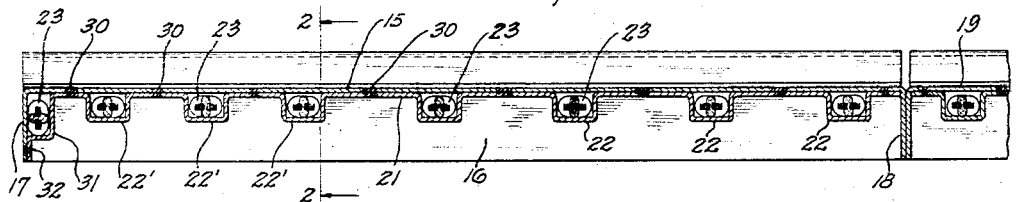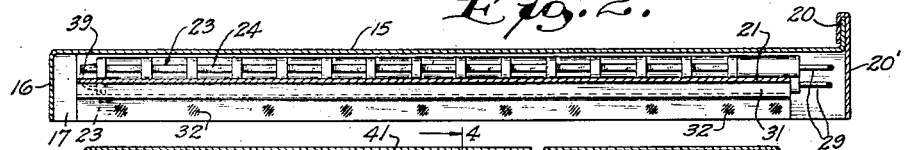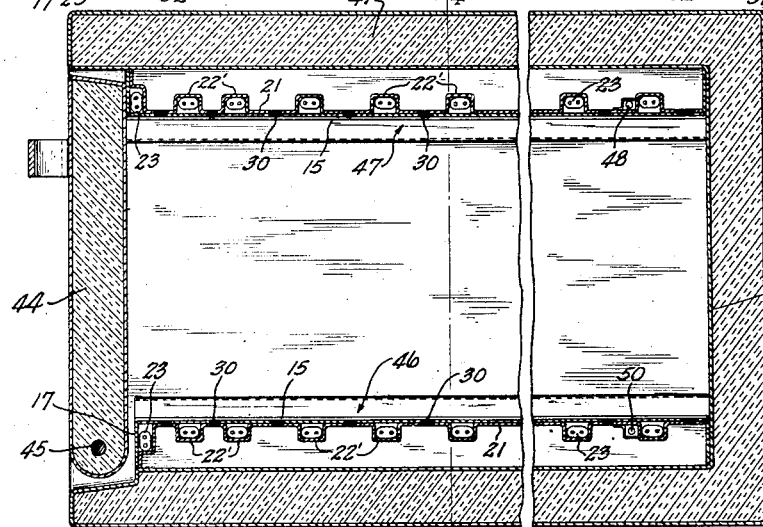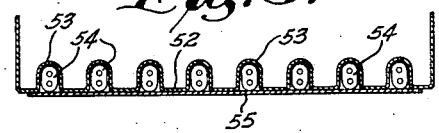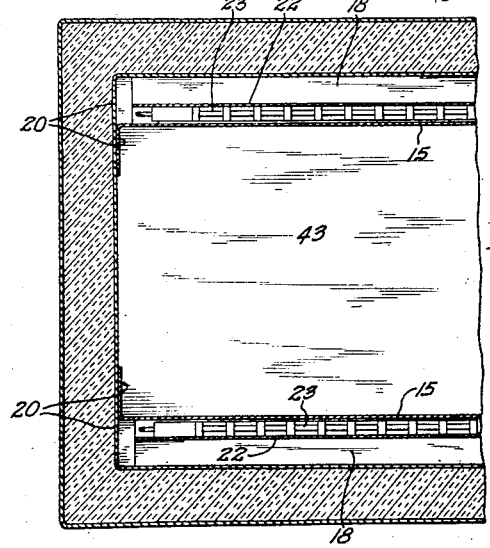
Feb. 11, 1947. H. N. SHAW 2,415,768
ELECTRIC OVEN
Filed Oct. 5, 1942 2 Sheets-Sheet 1
INVENTOR.
Harold N. Shaw
BY Morsell & Morsell
ATTORNEYS.

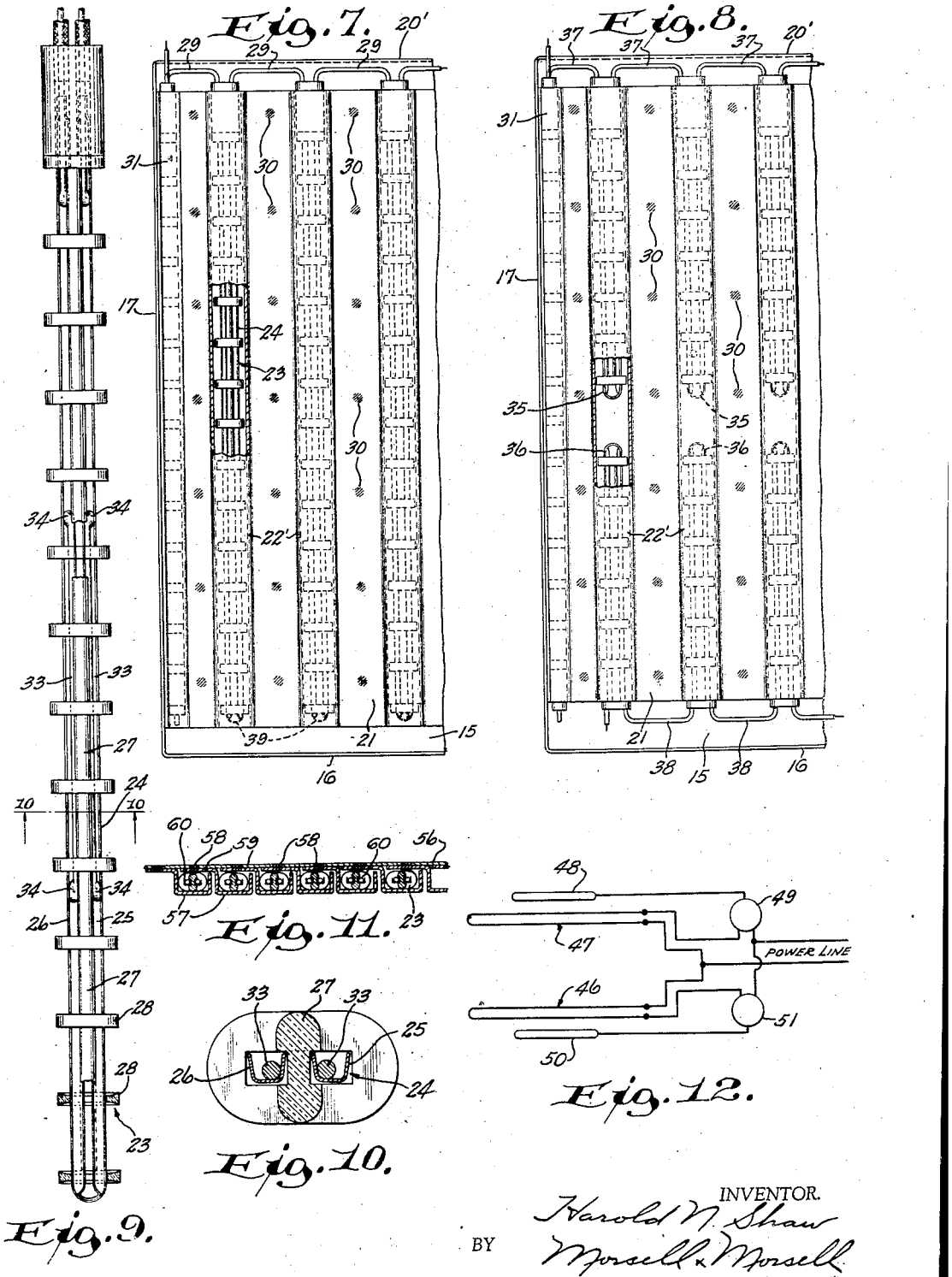

2,415,768

UNITED STATES PATENT OFFICE 2,415,768

ELECTRIC OVEN

Harold N. Shaw, Erie, Pa.

Application October 5, 1942, Serial No. 460,737

10 Claims. (Cl. 219—35)

This invention relates to improvements in electric heating and more particularly to heating for use in the cooking of food products.

Heretofore, in electric cooking devices such as griddles, the heating surface has been at least five-sixteenths of an inch thick with a relatively heavy heating unit associated therewith. Where the heating element is cast into the heating surface, a heavy cast metal plate is required. In other types of units where the heating elements are clamped in position, a heavy rigid plate is required for the heating surface to insure good heat conduction between the heating elements and the plate. The heating elements employed are generally of the enclosed strip or rod type or are radiant coils. In any event, the thick metal heating surfaces which have heretofore been considered necessary, are objectionable because they take too long to heat up, and in restaurants must be kept at frying heat between periods of use in order to avoid delays. As a result the cost of operation is excessive.

Prior practices in the manufacture of electric ovens with a heated lining have also been unsatisfactory because with strip heaters or other conventional type heating elements clamped to the top and bottom of the oven, the heat stored in the relatively heavy heating elements causes such wide variations in temperature that close control of baking heat and the maintenance of a uniform temperature throughout the oven has not been possible. As a result there has been no way of automatically controlling the uniform browning of baked products. Furthermore, in commercial electric baking ovens there is usually a heavy tile or brick hearth at the bottom with wire heating elements below the hearth and also under the top of the oven. The bottom elements radiate heat to the under side of the hearth and also heat the air which circulates around the sides of the hearth. The top elements radiate heat on the product being baked while the product is generally resting on the tile hearth. The principal reason for using a tile hearth in an oven is to obtain a flat uniformly heated surface. However, the slow heating of the heavy tile hearth and the lack of automatic control for the top heat are objectionable.

It is a principal object of the present invention to provide an electrically heated device wherein a relatively thin metal plate can be employed successfully for the surface to be heated, and wherein the heat distribution and the control thereof is such that unequal heating, which would normally cause buckling of a thin metal plate is prevented.

A further object of the invention is to provide an electrically heated device of the type described, including hoods for enclosing the heating elements and holding the latter against a surface of the cooking plate, the hoods being so arranged and secured in position as to provide a desired heat distribution both by heat radiated from the heating elements and also by heat conducted directly to the cooking plate from the hoods.

A further object of the invention is to provide a plate forming a heating surface and having one or more flanges on the edges thereof, there being means for directly heating said flanges to compensate for the cooling effect of air adjacent the edges of the heating surface.

A further object is to provide a device as above described wherein the hoods for the heating elements are in the form of sheet metal enclosures, said enclosures having flanges in contact with the heating plate and spot or seam welded to the plate at points intermediate the heating elements so as to conduct heat to the plate through the welding. With this arrangement substantially uniform heating of a thin metal cooking surface is possible and the use of the thin metal hoods and heating elements permit accurate and quickly responsive automatic temperature control.

A further object of the invention is to provide a device as above described wherein the heating elements are spaced closer together near an edge of the metal heating plate, or near the oven door, to provide extra heating at exposed portions and prevent temperature variation between interior portions of the plate and edge portions thereof.

A further object of the invention is to provide an electrically heated device including elongated heating elements together with means for reducing the heat radiated from those portions of the elements intermediate the length thereof.

A further object of the invention is to provide a device of the class described which is suitable for use in various electric cooking devices such as griddles, hot plates, fry kettles, and ovens.

A further object of the invention is to provide an electrically heated oven embodying light-weight metal heating surfaces at the top and bottom together with light-weight hood enclosed heating elements, the arrangement being such as to permit separate top and bottom temperature control for the oven.

A further object of the invention is to provide a heating device suitable for cooking purposes which is light in weight to facilitate shipment and installation.

A further object of the invention is to provide a heating device which is particularly adapted to utilize the light-weight hairpin type of element disclosed in my prior Patent No. 2,265,549, dated December 9, 1941.

With the above and other objects in view, the invention consists of the improvements in electric heating, and all its parts and combinations as set forth in the claims, and all equivalents thereof.

In the accompanying drawings, illustrating several embodiments of the preferred form of the invention, in which the same reference numerals designate the same parts in all of the views, Fig. 1 is a cross-sectional view of a griddle embodying features of the present invention;

Fig. 2 is a sectional view taken on line 2—2 of Fig. 1;

Fig. 3 is a vertical sectional view through an oven and oven door showing the improved heating device installed in the top and bottom of the oven;

Fig. 4 is a fragmentary sectional view taken on line 4—4 of Fig. 3;

Fig. 5 is a fragmentary cross-sectional view of a modified form of heating unit wherein the heating elements are arranged on edge in the hoods and wherein there is a corrugated heating surface. This arrangement is particularly adapted for use in oil heaters or fry kettles where a large corrugated heating surface is desirable;

Fig. 6 is a fragmentary view similar to Fig. 5, illustrating a modification of the design of Fig. 5;

Fig. 7 is a bottom view of the heating device of Fig. 1, parts being broken away;

Fig. 8 is a view similar to Fig. 7 illustrating a modified arrangement wherein two heating elements are installed in each hood with the inner ends spaced apart to reduce the heating effect in the center;

Fig. 9 is a plan view on an enlarged scale of one of the heating elements of Fig. 7 removed from the hood, parts being broken away;

Fig. 10 is a sectional view on an enlarged scale taken on line 10—10 of Fig. 9;

Fig. 11 is a fragmentary cross-sectional view of a heating device showing a modified hood arrangement; and Fig. 12 is a diagrammatic view illustrating the electric circuit to the top and bottom plates of the oven of Fig. 3.

Referring more particularly to Figs. 1 and 2 of the drawings illustrating a griddle arrangement, the numeral 15 designates a metal plate or surface to be heated having a front downwardly bent flange 16 and downwardly bent side flanges 17 and 18. Any number of griddle sections may be installed side by side, and the numeral 19 designates the surface to be heated of a second griddle section. At the back of the griddle section the plate 15 may be bent upwardly, as at 20, and equipped with a rear guard flange 20'. The plate 15 is formed of relatively thin sheet metal. Heretofore griddle plates have been at least five-sixteenths of an inch thick. With the present invention it is practical to utilize plates having a thickness of between one-sixteenth and one-eighth of an inch.

Secured to the bottom of the plate 15 is a sheet 22 of metal having a plurality of spaced and approximately parallel depressions 22 pressed therein. These depressions are substantially U-shaped in cross-section and form hoods or enclosures for heating elements 23. The heating elements are of the type illustrated in Figs. 9 and 10 and disclosed in my prior patent No. 2,265,549, dated December 9, 1941. These elongated heating elements may be threaded into the open ends of the hoods 22 and require no additional securing means.

Referring to Fig. 9, each heating element comprises a reversely bent heating element section 24 having parallel sections 25 and 26. These sections are separated from one another by longitudinal insulator segments 27, and between each pair of insulator segments 27 are holding members 28 of refractory material. These elements are light in weight and flexible and may be readily installed in the hoods and then connected in series with one another by the wires 29, as shown in Fig. 7.

An important feature of the present invention resides in the fact that the hood-forming sheet 21 is secured to the cooking plate 15 by welds 30. These welds are located in rows approximately midway between the hoods as shown in Fig. 7. The welding may be spot welding, seam welding, or arc welding, or the connection may be by means of brazing or soldering. As a result of this arrangement the plate 15 is heated partly by radiation from the heating elements and partly by heat conducted from the hoods through the welds. Approximately half of the heat is radiated to the enclosing hoods, and this heat is in turn conducted to the plate through the welded areas.

In lieu of the continuous sheet 21 formed with a plurality of parallel hoods or corrugations 22, each hood may be a separate member with the side flanges of one hood abutting the side flanges of adjacent hoods. In this case the adjacent edges of the flanges may be seam welded to the plate 15 or there may be a row of spot welding, such as the spot welding 30 along each flange edge. In any event, the welding is approximately intermediate the hoods. Thus the portions of the plate 15 which are not directly over the heating elements are heated by conduction through the welds, and the portions of the plate 15 directly over the heating elements and hoods are heated by radiation. As a result uniformity of heat distribution is promoted making it practical to employ relatively thin metal for the plate 15. If heating were not uniform, then buckling of the plate would be likely to occur unless thicker metal were employed. Thicker metal, however, takes too long to heat up, and a principal object of the present invention is to provide a practical construction for utilizing a thin plate that can be quickly heated.

Referring again to the griddle of Fig. 1, the exposed side flange 17, as well as the region of the plate 15 adjacent to said flange, is more subject to the cooling effect of the outside air than are intermediate portions of the plate. In view of the importance of obtaining even heat distribution where thin metal is employed for the plate 15, novel means is employed to compensate for the extra heat loss near exposed edges. One method of compensating for this loss is to have an additional hood 31 positioned adjacent the inner side of the flange 17. This hood 31 may be a continuation of the hood-forming member 21 of Fig. 1 or may be separately formed. The hood 31 is connected to the plate 15 by the welding 30 and is connected to the flange 17 by additional welding 32. This hood is arranged to accommodate one of the heating elements 23 with the element positioned at right angles to the other elements 23 below the plate 15.

As an additional method of compensating for heat losses near exposed edges, the hoods 22' near the exposed edge of the plate 15 may be placed closer together than the hoods 22 which are located farther inwardly. It is found that to obtain best heat distribution and the best compensation for loss of heat near exposed edges, that a combination of these two features is most efficient. Accordingly the griddle of Fig. 1 utilizes the close spacing of the hoods 22' and also the additional hood 31 and heating element adjacent the flange 17.

The above methods provide compensation for heat losses on the edges which extend parallel to the hoods and the elements. It is also desirable to provide compensation in a direction at right angles. With the present invention this is accomplished by limiting the amount of heat in the center of each heating element and by subjecting the plate portions above the ends of each heating element to the maximum amount of heat.

Referring to Figs. 9 and 10, there are shunt wires 33 welded as at 34 to the heating element channels 25 and 26. These shunt wires serve to increase the cross-section of the element and to thus decrease the amount of heat developed in the center of the element. This can be accomplished by any method of increasing the cross-sectional size of the heating element. It is to be noted that the shunt wires are located intermediate the length of each heating element so that approximately one-third of the length of each heating element on one end and one-third on the opposite end is free of the shunt wires.

Another method of decreasing the amount of heat intermediate the length of the heating elements is illustrated in Fig. 8. In this form of the invention instead of one full length heating element in each hood there are two short heating elements 35 and 36, with their inner ends spaced apart intermediate the length of the hoods. With this arrangement the elements 35 must be electrically connected at one side as at 37, and the elements 36 must be electrically connected on the other side as at 38.

It is also practical to install additional heating elements and hoods, such as the hoods 31 along the flanges 16 which extend at right angles to the flange 17.

In all forms of the invention the hood-forming member 21 must be thick enough to conduct heat from the elements to the welds without undue temperature rise in the hoods, and the plate 15 must be thick enough to distribute the conducted and radiated heat without excessive temperature variations between different areas on the plate. When the heat input is high, the plate 15 and hood-forming member 21 must be thicker than when the heat input is low.

It is to be noted from Fig. 2 that the closed ends 39 of the heating elements are adjacent the front flange 16 of the griddle to radiate heat directly on the front flange. The connections 29 between the elements are at the rear ends of the elements so that the back guard plate 20' is heated only by conduction. This is usually satisfactory in griddles as the griddle sections are made narrow to prevent any warping which might be due to the front and back running cooler than the sides and center. However, as before mentioned, extra heat for the front flange 16 and back guard plate 20' can be provided by having additional elements and hoods directly on the flange 16 and guard plate 18 in the manner in which the side flange 17 is equipped.

A thermostatic control for the griddle may be provided by clamping the bulb of a liquid expansion thermostat to the hood-forming member 21 between the elements or by welding a bimetallic thermostatic strip to one of the flanges on the hood member 21. The temperature control device must be very responsive because the temperature of a thin heating surface, such as the surface 15, may rise very fast and a sluggish thermostat would not be effective in providing close temperature control.

The connections between the spaced heating elements may be by way of the insulated wires 29 welded to the ends of the elements, or this connection may be made by welding the ends of the element ribbons 25 and 26 together and securing them in grooved porcelain insulators.

Referring to Figs. 3 and 4, there is illustrated an oven 40 having a top wall 41, a bottom wall 42, a rear wall 43, and a front insulated door 44 hinged for swinging movement as at 45. A heating device 46, like the heating device of Fig. 1, of proper size may be installed on the bottom 42 of the oven, as shown in Fig. 3. When used in an oven, however, the side flange 17 of the griddle is placed in the front of the oven. A second heating device 47 may be installed in the top of the oven in inverted position. It is to be noted that the flanges 17 in the front are both equipped with the extra hoods 31 enclosing heating elements. In addition the hoods 22' adjacent the front of the oven are spaced relatively close together, just as in the griddle installation. With this arrangement loss of heat adjacent the oven door is compensated for and it is possible to bake satisfactorily directly behind the oven door. As a matter of fact, uniform browning can be obtained in any position within the oven. The side walls and back of the oven do not operate as hot as the top and bottom plates, but this does not affect the browning of baked goods appreciably because ovens are built relatively low and most of the baking is done by heat radiated from the top and bottom. However, elements may readily be arranged along the side walls of the oven in any installation where this might be considered desirable.

In an oven installation, in lieu of inserting the separate heating devices 46 and 47, the top and bottom linings 41 and 42 of the oven may be employed in lieu of the heating plates 15. In this case the hood-forming members 21 will be secured to the lower side of the wall 42 by welding and to the upper side of the wall 41, and also to a vertical flange similar to the flange 17 and located back of the door. The hoods would then be surrounded by the heat insulating material in the oven walls.

As indicated in Fig. 3, and in the wiring diagram of Fig. 12, there is separate thermostatic control for the top heating device 47 and the bottom heating device 46. This control includes a bulb 48 of a liquid expansion thermostat 49 for the top heating device 47, and a bulb 50 of a liquid expansion thermostat 51 for the bottom heating device 46. These bulbs 48 and 50 are preferably secured adjacent one of the hoods as illustrated. This separate thermostatic control for the top and bottom of the oven provides for close control of top and bottom browning in the oven. It is practical only because the lightweight heating elements and relatively thin metal used in the plates 15 and hood-forming members respond quickly to temperature changes. Heretofore it has been necessary to use relatively thick metal which holds its heat a long time. Automatic control of browning has therefore not been practical.

The close temperature control in the oven of the present invention, together with the features which provide for even heat distribution from the front to rear, make possible a control of uniformity in browning never before approached. Furthermore, in the oven of the present invention the thin metal of the heating devices will change from one temperature to another quickly in response to new temperature settings.

Referring to Fig. 5, a modified heating device arrangement is illustrated. In this device the heating surface is the plate 52 which is formed with element-enclosing corrugations 53. The heating elements 54, identical to the elements of Fig. 9, are placed on edge in the hoods 53. A flat plate 55, which may be welded to the top plate 52 between corrugations, holds the elements in at the bottom. This type of installation is particularly desirable where a large heating area is necessary and may be employed in oil heaters or in the bottom of fry kettles. In this type of installation the bottom plate 52 may be clamped in position instead of welded, because the heat radiated downward is less than one-quarter of the heat radiated directly to the heating surface. An asbestos pad may also be used in place of the metal plate 55.

In order to concentrate still more heat in a given space, the modification of Fig. 6 may be employed wherein the corrugations 53' are of double height to accommodate two heating elements 54' placed on edge.

For high heat concentrations on griddles or hot plates the arrangement of Fig. 11 may be desirable. In this form of the invention there is a heating plate 56 having a plurality of dipper-shaped hoods 57 welded thereto as at 58. The flange 59 of each hood is overlapped by the adjacent hood and overlies the heating element 60 therein. With this arrangement all of the heat from the heating element 60 is absorbed by the hoods and by the flanges of the hoods and is conducted into the hot plate 56 through the welds. This construction permits the use of a greater number of the elements in series for high voltage on ovens or griddles. The hoods may also be shaped to accommodate elements which are positioned on edge as in Fig. 5.

The heat conducting hoods make possible the application of radiant elements to thin griddles and the like, without the use of heavy heat insulation, which absorbs heat and prevents accurate temperature control.

Heat treating furnaces, as for example those used for aluminum, may be built similar to Fig. 3 with such modifications as may be necessary to take care of higher temperatures. Ovens may also be built with elements extending from the front to back, with wider spacing in the center, and with an element from side to side along the flange back of the door. This would be used in small ovens for domestic purposes.

Various changes and modifications may be made without departing from the spirit of the invention, and all of such changes are contemplated as may come within the scope of the claims.

What I claim is:

1. In an oven having top and bottom walls and having a door, plates adapted to be heated positioned adjacent the top and bottom walls of the oven, a flange on the front of each plate adjacent an edge of the oven door, a plurality of elongated electric heating elements extending in spaced relation and positioned between the top plate and the top wall of the oven and between the bottom plate and the bottom wall of the oven, there also being a heating element positioned adjacent the inner surface of each front flange and extending parallel thereto, and spaced elongated metal hoods for receiving and holding said heating elements in position adjacent the plates and flanges.

2. In an oven having an oven chamber therein and having a door, a metal plate adapted to be heated and forming one of the horizontal walls of the oven chamber, a flange on the front of said plate directly behind the oven door, a plurality of elongated electric heating elements extending in spaced relation and positioned adjacent the side of said plate which faces away from the oven chamber, a heating element positioned behind said front flange, metal hoods covering said plurality of electric heating elements and secured to the plate, and a similar metal hood covering the front flange heating element and secured to said flange, said last-mentioned hood facing toward the flange.

3. In an oven having an oven chamber therein and having a door, a metal plate adapted to be heated and forming one of the horizontal walls of the oven chamber, a flange on the front of said plate directly behind the oven door, a plurality of elongated electric heating elements extending in spaced relation transversely of the depth of the oven and positioned adjacent the side of said plate which faces away from the oven chamber, a heating element positioned behind said front flange, metal hoods covering said plurality of electric heating elements and secured to the plate, and a similar metal hood covering the front flange heating element and secured to said flange, said last-mentioned hood facing toward the flange.

4. In an oven having an oven chamber therein and having a door hinged at its lower edge, a plate adapted to be heated and forming one of the horizontal walls of the oven chamber, a flange on the front of said plate directly behind the hinged portion of the door, a plurality of elongated electric heating elements extending in spaced relation and positioned adjacent the side of said plate which faces away from the oven chamber, there also being a heating element positioned behind said front flange, metal hoods covering said plurality of heating elements and secured to the plate and a similar metal hood covering the front flange heating element and secured to said flange, said last-mentioned hood facing toward the flange.

5. In an oven having an oven chamber therein and having a door, metal plates forming the top and bottom walls of said oven chamber, a flange on the front of each plate directly behind the oven door, a plurality of elongated electric heating elements extending in spaced relation and positioned adjacent the side of each plate which faces away from the oven chamber, there also being a heating element positioned behind each front flange, metal hoods covering the heating elements and secured to the plates, and a similar metal hood covering each front flange heating element and secured to said flanges, said last-mentioned hoods facing toward the flanges.

6. In an oven having an oven chamber therein and having a door hinged at its lower edge, a plate adapted to be heated and forming a bottom wall of the oven chamber, a flange extending along the front edge of said plate adjacent the inner side of the hinged portion of the door, electric heating means positioned adjacent the lower surface of said plate, electric heating means positioned adjacent the inner surface of said front flange, and means for directing substantially all of the heat from said front flange heating means to said front flange.

7. In an oven having an oven chamber therein and having a door hinged at its lower edge, a plate adapted to be heated and forming a bottom wall of the oven chamber, a flange extending along the front edge of said plate adjacent the inner side of the hinged portion of the door, electric heating means positioned adjacent the lower surface of said plate, heating means positioned adjacent the inner surface of said front flange, and a hood covering the front flange heating means and secured to said flange, said hood facing the flange.

8. In an oven having an oven chamber therein and having a door hinged at its lower edge, a plate adapted to be heated and forming a bottom wall of the oven chamber, a flange extending along the front edge of said plate adjacent the inner side of the hinged portion of the door, a plurality of elongated electric heating elements extending in spaced relation and positioned adjacent the lower surface of said plate, an elongated electric heating element adjacent the inner surface of said front flange and extending parallel thereto, metal hoods covering said plurality of heating elements and secured to the plate, and a metal hood covering the front flange heating element and secured to said flange, said last-mentioned hood facing toward the flange.

9. In an oven having an oven chamber therein and having a door hinged at its lower edge, a plate adapted to be heated and forming a top wall of the oven chamber, a flange extending along the front of said plate directly inwardly of and adjacent the upper edge of the door, a plurality of elongated electric heating elements extending in spaced relation and positioned adjacent said plate, an elongated heating element positioned adjacent the inner surface of said front flange and extending parallel thereto, metal hoods covering said plurality of heating elements and secured to the plate, and a metal hood covering the front flange heating elements and secured to said flange, said last-mentioned hood facing toward the flange.

10. In an oven having an oven chamber therein having a door hinged at its lower edge, a plate adapted to be heated and forming a top wall of the oven chamber, a flange extending along the front of said plate directly inwardly of and adjacent the upper edge of the door, electric heating means positioned adjacent a surface of said plate, electric heating means positioned adjacent the inner surface of said front flange, and means for directing substantially all of the heat from said front flange heating means to said front flange.

HAROLD N. SHAW.

REFERENCES CITED

The following references are of record in the file of this patent:

UNITED STATES PATENTS

| Number | Name | Date |
|---|---|---|
| 2,019,780 | Gough | Nov. 5, 1935 |
| 2,035,757 | Ottenstein | Mar. 31, 1936 |
| 1,110,532 | Byce | Sept. 15, 1914 |
| 759,909 | Pelton | May 17, 1904 |
| 2,199,650 | Price | May 7, 1940 |
| 2,224,552 | Sickinger | Dec. 10, 1940 |
| 1,967,184 | Clapp et al. | July 17, 1934 |